(12) United States Patent
Milovich et al.

(10) Patent No.: US 10,262,538 B1
(45) Date of Patent: Apr. 16, 2019

(54) DATABASE MANAGEMENT FOR POTENTIAL PULL-OFF AREAS

(71) Applicant: Apple Inc., Cupertino, CA (US)

(72) Inventors: Matisse J. Milovich, Cupertino, CA (US); YoungWoo Seo, Pleasanton, CA (US); Matthew E. Last, San Jose, CA (US)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 15/710,027

(22) Filed: Sep. 20, 2017

Related U.S. Application Data

(60) Provisional application No. 62/398,134, filed on Sep. 22, 2016.

(51) Int. Cl.
*G08G 1/14* (2006.01)
*H04W 4/04* (2009.01)

(52) U.S. Cl.
CPC ............. *G08G 1/144* (2013.01); *G08G 1/147* (2013.01); *H04W 4/046* (2013.01)

(58) Field of Classification Search
CPC ............ G06N 99/005; G06F 17/30241; G08G 1/143; G08G 1/144; G08G 1/146; G08G 1/147; H04W 4/046
See application file for complete search history.

(56) References Cited

U.S. PATENT DOCUMENTS

| | | | | |
|---|---|---|---|---|
| 8,063,797 B1* | 11/2011 | Sonnabend | ........ | G06K 9/00791 340/932.2 |
| 8,718,861 B1* | 5/2014 | Montemerlo | ......... | B60W 30/00 701/26 |
| 2009/0271101 A1* | 10/2009 | Relyea | ................. | G08G 1/0104 701/118 |
| 2016/0110997 A1* | 4/2016 | Ur | ............................ | G08G 1/00 701/23 |
| 2016/0321926 A1* | 11/2016 | Mayer | .................. | G08G 1/0112 |
| 2017/0344010 A1* | 11/2017 | Rander | .............. | G01C 21/3438 |
| 2018/0121833 A1* | 5/2018 | Friedman | ........... | G01C 21/3685 |
| 2018/0174454 A1* | 6/2018 | Tiwaree | ................. | G08G 1/148 |
| 2018/0283895 A1* | 10/2018 | Aikin | .................. | G01C 21/3415 |

OTHER PUBLICATIONS

Langley, Hugh, "TomTom will soon guide you to the nearest free parking spot," TechRadar, Apr. 29, 2015, http://www.techradar.com/news/car-tech/tomtom-will-help-build-self-driving-cars-that-find-you-a-parking-spot-1292420, accessed Oct. 13, 2017, 3 pages.

(Continued)

*Primary Examiner* — An T Nguyen
(74) *Attorney, Agent, or Firm* — Polsinelli PC

(57) ABSTRACT

Aspects of the present disclosure involve systems, methods, computer program products, and the like, for creating a database of pull-off areas for a vehicle based on aggregated pull-off information received from a plurality of vehicles and other sources. In one embodiment, the aggregated, crowd-sourced pull-off information may be available to a mobile device (such as an autonomous vehicle or mobile communication device) for reference by the device to understand the condition, location, and availability of potential pull-off areas near a roadway.

20 Claims, 10 Drawing Sheets

(56) References Cited

OTHER PUBLICATIONS

ParkMe Parking, by INRIX, Inc., available on the App Store for iOS devices, https://itunes.apple.com/us/app/parkme-parking/id417605484?mt=8, accessed Oct. 13, 2017, 2 pages.
Parker—Find open parking, by Streetline, Inc., available on the App Store for iOS devices, https://itunes.apple.com/us/app/parker-find-open-available/id399573859?mt=8, accessed Oct. 13, 2017, 2 pages.
USA Rest Stops, by Innovative Software Technoloy, LLC, available on the App Store for iOS devices, https://itunes.apple.com/us/app/usa-rest-stops/id528988698?mt=8, accessed Oct. 13, 2017, 3 pages.
"The Streetline Solution," Streetline, https://www.streetline.com/how-it-works/, accessed Oct. 13, 2017, 13 pages.

* cited by examiner

DATABASE MANAGEMENT FOR POTENTIAL PULL-OFF AREAS

CROSS REFERENCE TO RELATED APPLICATIONS

This application claims the benefit of U.S. Provisional Application Ser. No. 62/398,134, filed Sep. 22, 2016, and entitled "DATABASE MANAGEMENT FOR POTENTIAL PULL-OFF AREAS", the entire contents of each are incorporated herein by reference for all purposes.

TECHNICAL FIELD

This disclosure relates generally to maintaining a database of potential pull-off areas along a roadway for a vehicle, and more specifically to receiving and updating information of potential pull-off areas in a central database that may be accessed and utilized by a vehicle or vehicle operator for operation of the vehicle.

BACKGROUND

Oftentimes, during operation of a vehicle, a need arises to pull the vehicle off of the road onto a shoulder or rest area. For example, an operator of a vehicle may veer onto a shoulder or side of the road to avoid an obstacle in the road, may steer the vehicle onto the side of the road when the vehicle malfunctions, may pull off to let another vehicle pass, or may seek a rest area or parking area to park for some time. However, available pull-off and parking locations are not always visible to the driver. Further, even when such a location is within line of sight, there may be a better location around the corner that is equally reachable, but that would provide additional services or benefit to the driver. For instance, a suitable location further down the road may be safer (i.e., further from traffic) or have no penalty associated with parking there. Vehicles with on-board sensors also have limited look-ahead distance and provide limited knowledge and confidence about the world ahead.

DETAILED DESCRIPTION

Figure 1:
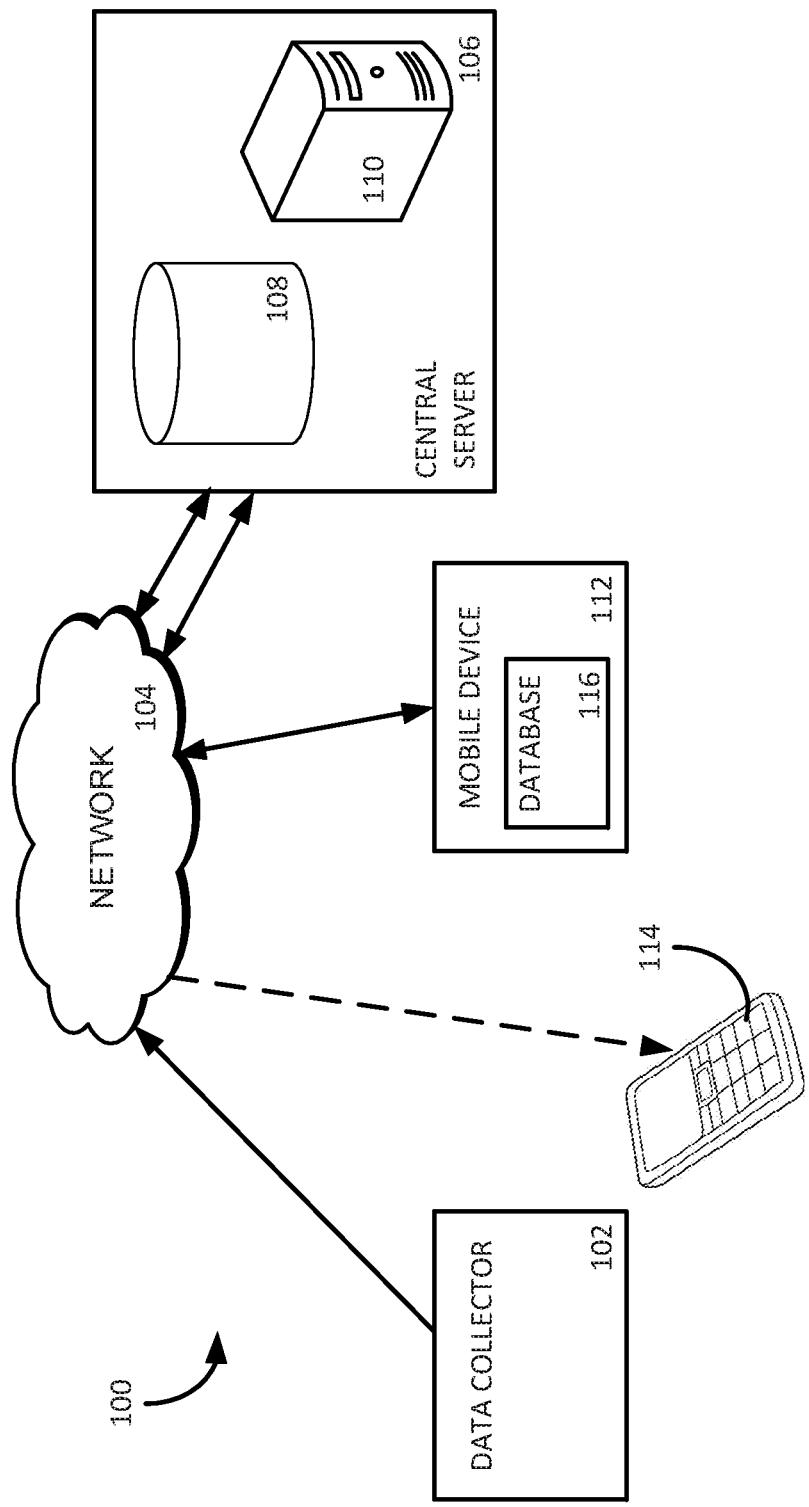
FIG. 1 is a diagram of a system for collecting pull-off data from one or more data collectors to determine a pull-off area for a vehicle.

Aspects of the present disclosure involve systems, methods, computer program products, and the like, for creating a database of pull-off areas for a vehicle based on aggregated pull-off information received from a plurality of vehicles and other sources. In one particular implementation, a vehicle may include one or more sensors for gathering various information of pull-off area, including surface conditions, slope and/or gradient information, obstacles in the potential pull-off area, presence of shrubs or other vegetation, etc. This information may be associated with a geographic location. The information may be transmitted or otherwise provided to a server or other aggregating device for storage and correlation with other similar information from other data collectors to create the database of pull-off areas. The database server may be in communication with and receive information from numerous such vehicles to create a crowd-sourced collection of information of a region that includes current or recent pull-off area conditions accessible by geographic location. In yet another implementation, the pull-off information may be gathered by other types of mobile devices that communicate with the database server.

In addition, the aggregated, crowd-sourced pull-off information may be available to a mobile device (such as an autonomous vehicle or mobile communication device) for reference by the device to understand the condition, location, and availability of potential pull-off areas near a roadway. For example, a mobile device may request or otherwise receive the pull-off information stored in the database server. With this information, the mobile device may determine a potential pull-off area for a vehicle or user of the vehicle. For example, the mobile device may obtain the information stored in the database, including the conditions of the potential pull-off area. While proceeding along a roadway, the mobile device may receive an indication of a need of use of a pull-off area, such as to veer a vehicle onto the shoulder of the road or to access a rest area ahead of the mobile device. Through the database, the mobile device may correlate an estimated geographic location of the mobile device with the information stored in the database to identify a pull-off area for the mobile device or user of the mobile device. In one embodiment, the identified pull-off area is at least partially based on a particular maneuver of a vehicle. In this manner, a database of potential pull-off areas for a geographic region may be maintained and utilized to determine a route or maneuver of a vehicle or user of a mobile device.

The information aggregated at the database may be collected and provided by any number of vehicles or other data collectors. Other data collector examples include mobile computing devices, such as mobile phone and tablets, or other computing devices configured to perform any of the operations described herein. In addition, such information may be stored at the data collector until the data collector is in communication with a network through which the database may be accessed. For example, in transit, there may be times when the data collector is not able to wirelessly communicate with the database. In such circumstance, the data collector may collect and store the geographic-tagged pull-off conditions and information until the data collector is in communication again with the network server. In another implementation, the data collector may transmit the collected data to another data collector in communication with the database. In this manner, the database may receive updated pull-off information for a particular geographic location from several data collectors and provide such information to mobile devices for use in controlling or navigating a vehicle. In another implementation, the data collectors may store the collected information locally, transmit the stored information with other data collectors, and utilize the information for controlling or navigating the vehicle.

FIG. 1 is a diagram of a system for collecting pull-off data from one or more data collectors 102 to determine a pull-off area for a vehicle or other mobile device 112, which data may then be used to control or navigate a vehicle. Although illustrated as including certain components, it should be appreciated that the system 100 may include more or fewer components than those illustrated. For example, the network 104 illustrated in FIG. 1 may include any number of networking components, such as routers, servers, switches, and the like. Thus, the system 100 should not be considered to be limited to the components shown. Rather, the components of FIG. 1 are included to simplify the discussion of the operations of the system 100 described below.

In general, the system 100 may include one or more data collectors 102 for collecting potential pull-off information along a roadway. In one particular implementation, the data collector 102 is a vehicle equipped with one or more sensors for detecting a road or other surface condition and/or information in the vicinity of the vehicle. The one or more sensors of the data collector 102 may be any type of sensor for detecting the condition of a road around the collector. For example, a vehicle 102 may be equipped with one or more road condition sensors, including but not limited to, wheel speed sensors to detect wheel traction, accelerometers to determine the speed and position of the vehicle, accelerator data, a light detection system, and the like. In one particular example, the vehicle may include a sensor to detect reflected light from a light projected onto the side of a road and compare the detected reflected light to a database of condition reflectiveness profiles to determine the condition of the side of the road.

In another example, the vehicle 102 may include object detection systems to determine objects on the side or near a roadway of the vehicle. Such objects may be detected through one or more vision systems, such as an infra-red camera, a Light Detection and Ranging (LIDAR) detector, a Radio Detection and Ranging (RADAR) detector, a millimeter wave camera, stereo imaging sensors, structured light sensors, non-imaging photo-detectors, and the like.

In one embodiment, the data collector 102 is in communication with a network 104 and transmits one or more of the collected data to the network. In one particular implementation, the data collector 102 communicates wirelessly with the network 104, although a wired connection may also be utilized. The network 104 may be any type of data network configured to transmit and/or receive data, including a cellular network and a wi-fi network. In one embodiment, the network 104 facilitates the transmission of the collected data 102 to a central server 106. In another embodiment, the central server 106 may form a portion of the network. Regardless of the embodiment utilized, at least a portion of the information collected by the data collector 102 is transmitted to the network for storing at the central server 106.

To facilitate storing of the data from the data collector 102, the central server 106 may include a pull-off database 108 or other type of data storage, which may be distributed. Further, as explained in more detail, the central server 106 may receive the pull-off information from several data collectors 102. Further, such information may be aggregated and correlated to the geographic location associated with the information. Thus, the information received at the central server 106 may include a processing component 110 for aggregating the information into an accessible database 108. As also explained in more detail below, the central server 106 may associate a confidence score for one or more of the pull-off areas stored in the database based on the received information. Thus, in one implementation, the processing component 110 of the central server 106 may perform this analysis of the received information and generation of the confidence score for the pull-off areas. It should be appreciated that, although illustrated in FIG. 1 as including the database 108 and the processing device 110, the central server 106 may include any number of components centrally located or spread across the network 104 or other networks. For example, several processing devices 110 and/or databases 108 may be associated with the central server 106 for processing and storing of the received data. Further, a central processing device may be included for coordinating communications between the various components of the central server 106. In one implementation, the central server 106 includes enough components to receive and process information from any number of vehicles 102 or other types of data collectors.

Also included in the system 100 of FIG. 1 is a mobile device. In one particular implementation, the mobile device is a vehicle, such as an autonomous vehicle. The mobile device 112 communicates with the network 104 to receive and provide pull-off information, among other types of information. For example, the mobile device 112 may access the network 104 to obtain the information stored in the pull-off database 108. This information may be stored local to the mobile device in a local pull-off database 116. As described in more detail below, the local pull-off database 116 may be utilized by the mobile device 112 to select a pull-off area for the vehicle. For example, the mobile device 112 may utilize the local database 116 to select a parking lot or rest area ahead of the vehicle when a desire to access such a location is received by the mobile device. In another example, the mobile device 112 may utilize the local database 116 to select a location on a shoulder of a roadway to control an autonomous vehicle onto the shoulder to avoid an obstacle in the road or when the vehicle is disabled. In one example, a confidence score associated with the potential pull-off areas in the local database 116 may be used when selecting an area from the database.

Figure 2A:
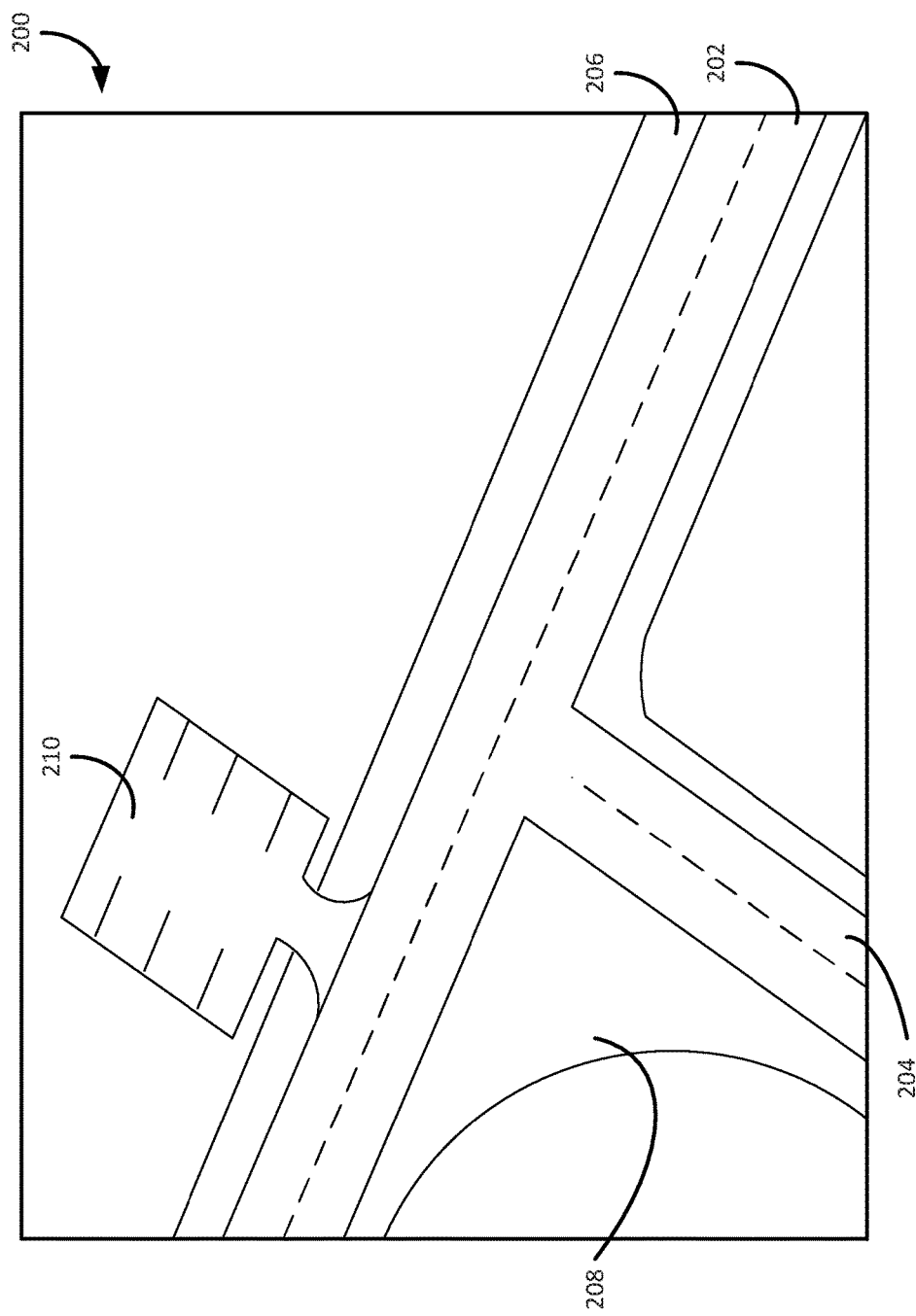
FIG. 2A is a diagram illustrating high confidence pull-off areas along a roadway.

As mentioned above, data collected from the data collector 102 may include information concerning a condition or environment of a pull-off area. For example, FIG. 2A is a diagram illustrating one or more pull-off areas along a roadway that may be utilized by a vehicle. In particular, the diagram 200 is an overhead illustration of an intersection of two roadways 202, 204. Along the side of each roadway 202, 204 are potential pull-off areas. For example, along the side of roadway 202 is a shoulder 206 area. Similarly, a shoulder area 208 is in place near the intersection of the roadways 202, 204. Also illustrated is a parking area 210 or rest stop area for vehicles to pull into and park. Each of these areas may be noted as a potential pull-off area for one or more vehicles traveling along the roadways 202, 204. It should be appreciated that the potential pull-off areas shown in FIG. 2A do not include all of such potential pull-off areas. Rather, any type of area near a roadway may be collected and included by the data collector 102, such as runaway ramps, shoulders, unused traffic lanes, driveways, hills or ditches near a roadway, parking spots, rest areas, areas of interest, etc.

For the various potential pull-off areas collected by the data collector 102, information pertaining to each area may also be gathered. For example, the data collector 102 may collect a particular geographic location, region, or area for each pull-off candidate. Footprint information may also be collected, such as size and shape of the pull-off area, the material of the pull-off area (paved, dirt, vegetation, etc.), friction estimates of the area, slope and gradient information, the presence of obstacles within the area (such as trees, boulders, abandoned cars, etc.), potential hazards near the pull-off area (such as cliffs, sharp drop-offs, potential falling rocks, the presence of shrubs or arresting cables to slow a moving vehicle, etc. Such information may be obtained through one or more sensors of the data collector 102, associated with the potential pull-off candidate, and provided to the database for storing. Other less static information about the pull-off area may also be collected and stored in the database, such as traffic density at or near the pull-off area, the likelihood of changes to the pull-off area, current or recent weather conditions at the pull-off area, the presence of certain amenities for passengers or operators of a vehicle (such as gas, electric power hook-ups, emergency phones, food, lodging, hospital, etc.), and an indication of the last date and/or time of the inspection or data collecting of the potential pull-off area. In general, any information concerning a state or condition of the pull-off area or information concerning the data collecting of the pull-off area information may be obtained, associated with a pull-off area, and stored in the pull-off area database.

The information concerning the potential pull-off areas may be collected by one or more data collectors 102. As discussed above, the data collector 102 may be a vehicle with one or more sensors to obtain the pull-off area information. Other data collectors 102 may also be used. For example, the data collector 102 may be a camera mounted near a pull-off area candidate that may monitor the condition of the pull-off area. In another example, the data collector 102 may be user of one or more sensors, such as an operator of a camera, that visually obtains the information of the pull-off area and provides such information to the database 108 of the central server 106. In yet another example, satellite imagery of the pull-off areas may be obtained and provided to the central server 106 for inclusion in the database 108.

Figure 2B:
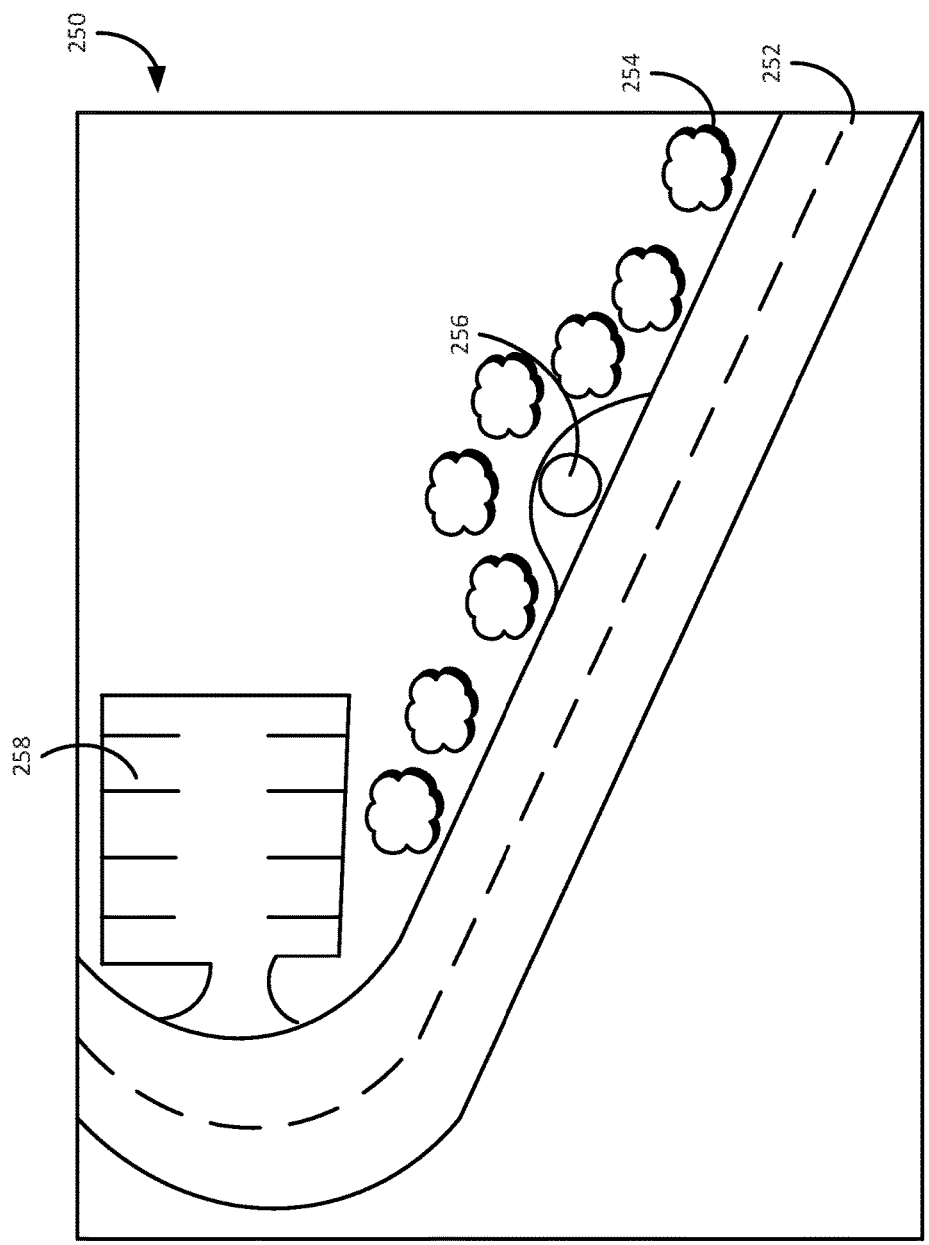
FIG. 2B is a diagram illustrating low confidence pull-off areas along a roadway.

FIG. 2B is an alternate diagram 250 illustrating one or more pull-off areas along a roadway that may be utilized by a vehicle. In general, the pull-off areas illustrated in FIG. 2B may be non-optimal pull-off areas based on one or more conditions of the pull-off area. The diagram 250 is an overhead illustration of a roadway 252. Along the side of the roadway 252, are potential pull-off areas. For example, illustrated is a parking area 258 or rest stop area for vehicles to pull into and park. However, in contrast to the pull-off areas illustrated in FIG. 2A, the potential pull-off areas of the diagram 250 of FIG. 2B may not be optimal for guiding a vehicle onto the pull-off area. For example and as illustrated in diagram 250, the shoulder of the roadway 252 may include dense vegetation or trees that limits the space available on the shoulder to maneuver a vehicle. Other obstructions may also be present. For example, the shoulder may include an area for a pull-off, but a rock or boulder 256 may be in the area preventing a pull-off of the vehicle. Further, although parking or rest areas 258 may be nearby, such areas may not be known to an operator of a vehicle or the vehicle sensors if the parking area is located around a corner of the road or otherwise out of sight of the vehicle. These condition and location of pull-off areas are just some examples of the information that may be collected and stored in a database for use by a vehicle or operator of a mobile device.

As mentioned above, the pull-off information that is collected by the one or more data collectors 102 may be transmitted to a central server 106 for storing in a database 108 of pull-off information. Further, the information stored in the server database 108 may be downloaded or otherwise obtained to a database 116 of a mobile device 112. In one implementation, the mobile device 112 is an autonomous vehicle that includes the pull-off area database 116. The local database 116 may receive information stored or otherwise available in the central server database 108 for use in operating the vehicle. In another example, the information stored in the central server 108 database may be accessible to one or more mobile communication devices 114, such as a smartphone or tablet device. Regardless of the device utilized to obtain the pull-off area information, such information may be based on an estimated location of the device such that only a subset of the entire contents of the central database 108 may be downloaded to the device at any one time. Accessing of the pull-off information in the database 108 by other computing devices is also contemplated.

Figure 3:
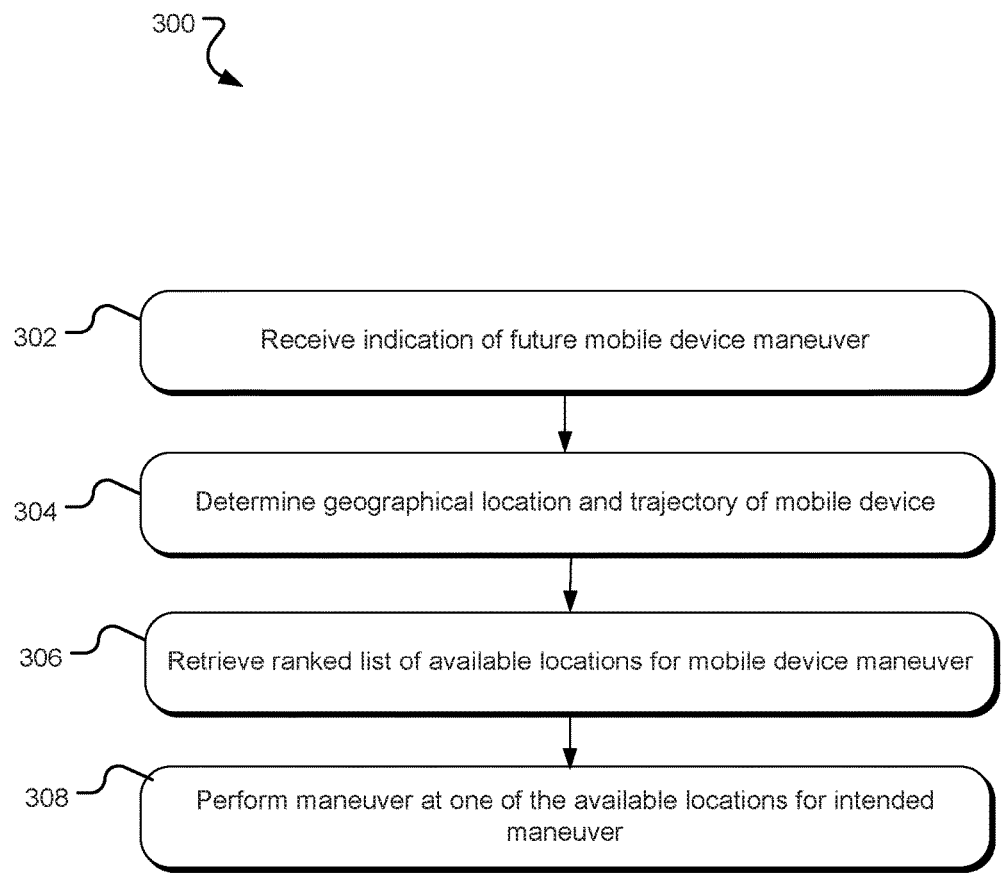
FIG. 3 is a flowchart of a method for utilizing a database of potential pull-off areas along a roadway to determine an operation of a vehicle.

In some instances, the pull-off information stored in the central database 108 or the local database 116 may be used to operate a vehicle, either automatically through an autonomous or semi-autonomous vehicle or through a driver of the vehicle. For example, FIG. 3 is a flowchart of a method 300 for utilizing a database of potential pull-off areas along a roadway to determine an operation of a vehicle 112. In one implementation, the operations of the method 300 are performed by a vehicle 112 through accessing a local database 116 of pull-off information or utilizing a network 104 to access a central database 108 of such information. In other implementations, the operations may be performed by an operator or controller of the vehicle or mobile device 112.

Beginning in operation 302, the local 116 or central database 108 receives an indication of a future maneuver of the vehicle 112. In general, the maneuver of the vehicle 112 is related to a particular pull-off area. For example, the database 116 may receive an indication that an operator of the vehicle 112 intends to pull the vehicle off the road to park the vehicle at a nearby location. In another example, the database 116 may receive an indication that the vehicle 112 is malfunctioning and needs to pull-off the road to be repaired. In yet another example, the database 116 may receive an indication that the vehicle 112 is near an obstacle in the road and will attempt to use a shoulder on the side of the road to steer around the obstacle. The indication of the future vehicle 112 maneuver may be received from any operator or device, such as a driver of the vehicle 112, a passenger of the vehicle, or the vehicle itself in response to receiving information from a sensor associated with the vehicle. Further, the indication may be received through an input device to the vehicle 112, such as a touchscreen, or as an instruction received from a processing device of the vehicle.

In operation 304, the vehicle 112 determines an estimated geographic location and/or trajectory of the vehicle. As mentioned above, the pull-off area information in the database 116 may be associated with a particular geographic location or roadway. Thus, the information stored in the database may be searchable based on a geographic region. Further, the information obtained and stored in the database 116 may itself be based on an estimated geographic region of the vehicle 112. For example, the vehicle 112 may be configured to retrieve pull-off area near the vehicle as the vehicle travels along a road so that the database 116 does not become full with pull-off candidates far away from the vehicle's location. Rather, those pull-off area candidates near the vehicle's location and/or in front of the vehicle may be the most relevant to the operation of the vehicle 112. In this manner, the local database 116 may include pull-off information that is relevant to the current position and trajectory of the vehicle 112. For this reason, operation 304 may be performed prior to operation 302 in some embodiments to maintain a database 116 of local pull-off areas. The estimated geographic location and trajectory of the vehicle 112 may be obtained, in one example, through a Global Positioning System (GPS) device. Other localization techniques are also contemplated.

In operation 306, the vehicle 112 retrieves or receives a ranked list of available pull-off locations for the future vehicle maneuver. For example, a type of pull-off area may be determined based on the type of vehicle maneuver received from the vehicle 112. Thus, a parking pull-off area may be determined or obtained in response to an indication of a parking maneuver of the vehicle. Similarly, a shoulder pull-off area may be determined in response to an indication of an obstruction avoidance maneuver or a malfunctioning vehicle maneuver. From the indicated maneuver, a list of potential pull-off areas near the vehicle's location is obtained. The distance from the vehicle's estimated location and the pull-off candidates in the list of pull-off areas may be based on the type of vehicle maneuver. Rest area or parking pull-off areas that are further from the vehicle's current location may be obtained compared to pull-off areas for an obstacle avoidance maneuver.

The obtained list of available pull-off areas for the intended maneuver of the vehicle 112 may be ranked based on a confidence or effectiveness score. As explained in more detail below, a confidence score may be associated with each pull-off candidate in the database 116 or the retrieved list of candidates. In general, the confidence score associated with each candidate is based on information stored for each pull-off area. For example, a potential pull-off area that includes obstructions such as trees, rough surface material, slope and gradient information, etc. may have a lower confidence score than a potential pull-off area that is free of obstacles or provides a large and clear pull-off area. With the information stored in the database 116 and/or the information about each pull-off candidate, the list of candidates is ranked based on a confidence score associated with each candidate or other stored information.

With the ranked list of potential pull-off candidates based on the intended maneuver, the vehicle 112 may perform the intended maneuver utilizing the ranked list of potential pull-off candidates in operation 308. In particular, the vehicle 112 may be maneuvered utilizing at least one of the pull-off candidates from the ranked list of pull-off areas. In an instance where the vehicle 112 is an autonomous vehicle, the vehicle may select a pull-off area from the ranked list of pull-off area candidates and control the vehicle to perform the intended maneuver. In another example, an operator of the vehicle may select a pull-off area from the ranked list of pull-off area candidates and control the vehicle to perform the intended maneuver. For example, the vehicle 112 may be steered onto a shoulder area at the side of the roadway to avoid an obstacle utilizing one of the pull-off candidates in the ranked list. In another example, the vehicle 112 may be steered into a parking area ahead of the vehicle based on the ranked list of potential pull-off parking areas from the local database 116. In this manner, the vehicle 112 is controlled based on the stored pull-off area information and candidates.

Figure 4A:
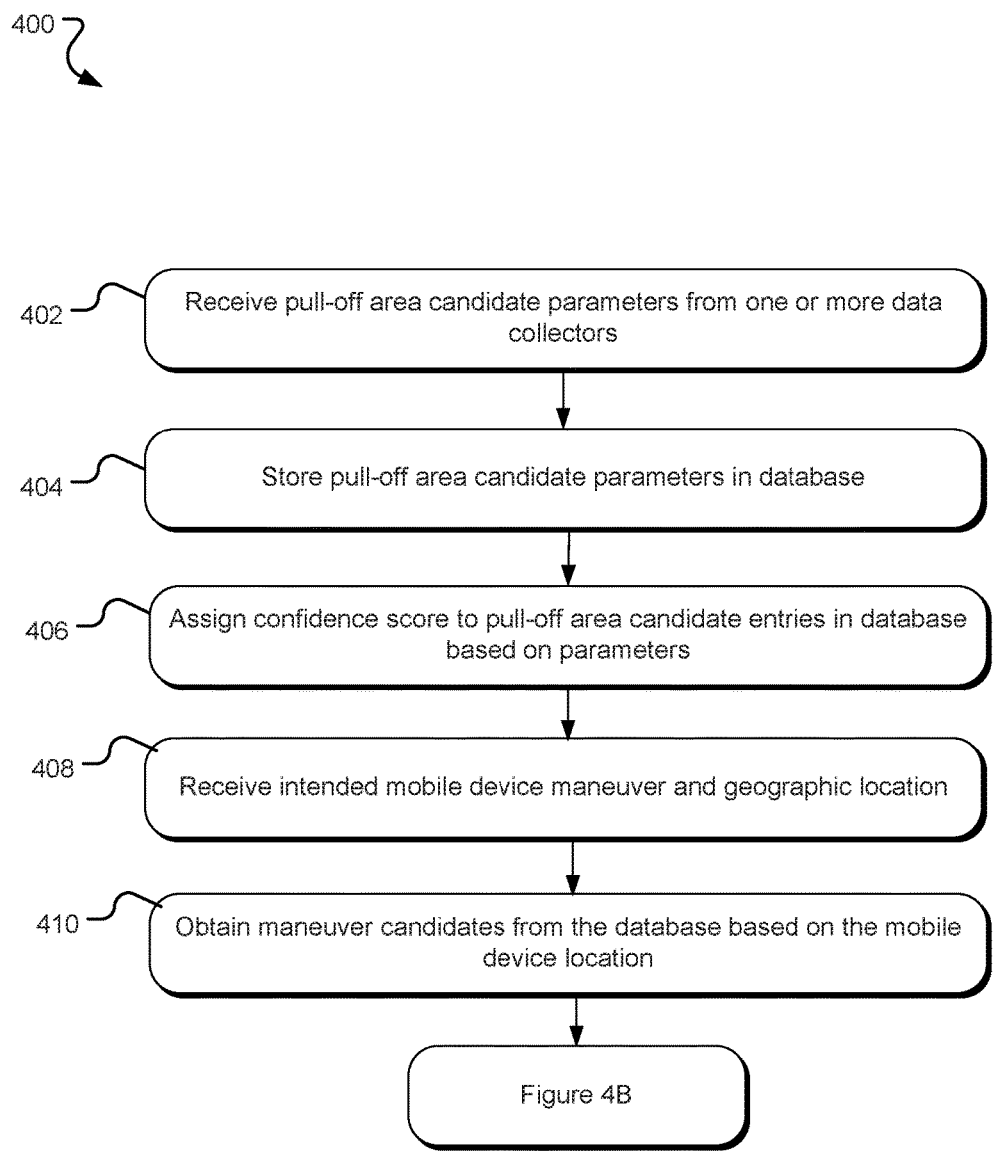
FIGS. 4A-4B is a flowchart of a method for receiving pull-off area candidates and providing confidence rankings to the received candidates.
Figure 4B:
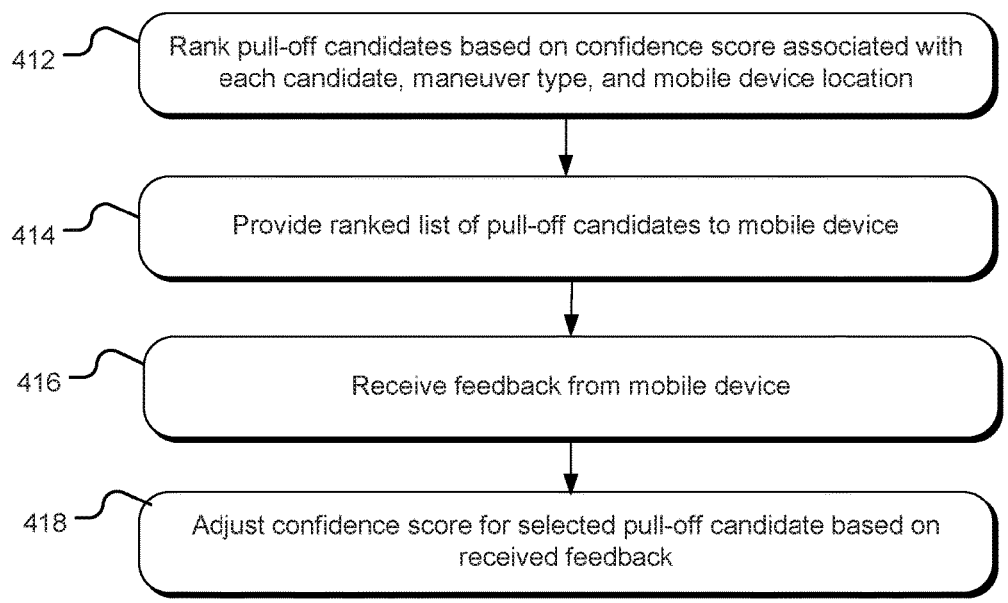

FIGS. 4A-4B is a flowchart of a method 400 for receiving pull-off area candidates and providing confidence rankings to the received candidates. In general, the method 400 may be performed by any computing device of the system 100 illustrated in FIG. 1. For example, a computing device 110 of the central server 106 may perform one or more of the operations of the method 400. In another embodiment, the mobile device 112 or vehicle may perform one or more of the operations. In still another embodiment, the central server 106 may perform some operations of the method 400 while the vehicle 112 may perform other operations. Thus, although discussed herein in regards to a central server 106, it should be appreciated that the mobile device 112 may also perform the described operations. Regardless of the implementation, the method 400 of FIGS. 4A-4B provide for a pull-off database that may be utilized to control a vehicle to access a pull-off area for any number of purposes.

Beginning in operation 402, the central server 106 receives pull-off area candidates and parameters of the candidates from one or more data collectors 102. As described above, the information may include pull-off area types, information of the condition of the pull-off areas, current or past traffic or environmental information near the pull-off areas, a geographic location of the candidate pull-off areas, etc. Further, the information may be received from a variety of data collectors 102, including but not limited to, vehicle sensors, cameras and camera operators, satellite images, mobile communication devices, etc. In operation 404, the received information is stored in a database 108. In one embodiment, the information is organized within the database 108 based on geographic location for ease of access by a traveling vehicle 112 or user of the system 100. One or more of the parameters of the pull-off area candidates may also be stored and associated with the candidate within the database 108.

In operation 406, a confidence score is associated with one or more of the pull-off area candidates stored in the database 108. In particular, a computing device 110 in communication with the database 108 may analyse the information associated with the pull-off area candidates and assign a confidence score to each entry. The confidence score, in general, is associated with a "fitness" of a particular pull-off area candidate to a particular vehicle 112 maneuver. Thus, each pull-off area candidate may be considered for any number of pull-off maneuvers, such as utilizing the area to avoid an obstacle in the roadway or path of the vehicle, pulling off of the road for emergencies or a disabled vehicle, pulling into a rest stop or parking area for food/lodging/resting, and the like. As should be appreciated, some pull-off areas are sufficient for some maneuvers, but not others. For example, a shoulder on the side of the road may be utilized to avoid an obstacle, but may not be suitable for parking a vehicle for a long period of time. Conversely, a parking area further along a road upon which a vehicle is traveling may be suitable for providing amenities to passengers of a vehicle, but may be unhelpful to swerve a vehicle to avoid an obstacle in the roadway near the vehicle. Thus, each pull-off area candidate in the database 108 may receive a confidence score related to a type of pull-off maneuver of the vehicle 112.

Further, the confidence score may account for any variable or parameter known about the pull-off area. For example, the confidence score assigned to a pull-off area may consider the conditions of the pull-off area, such as the presence of potential obstacles in the area, the road material and friction of the surface of the area, the slope and/or gradient of the area, the presence of cliffs or potential falling rocks in or near the area, the presence and location of amenities, and the like. Additional information may also be considered when determining the confidence score of an area. For example, the last date of received information about the area may be considered. An estimated traffic density at the pull-off area may also be considered. In this example, the confidence score for the pull-off area candidate may be lowered during times of expected high traffic density over times of expected low traffic density. Weather patterns and the likelihood that the condition of the pull-off area may also be considered. Parking sport availability and potential cost for parking may also be included in the database and considered for the confidence score. Such parking availability may be received from any of the data collectors 102 discussed herein to continually update the state of any one parking location. In general, any known or estimated condition or state of the pull-off area candidates may be considered by the computing device 110 when associating a confidence score with the candidate in the database 108.

In operation 408, the computing device 110 receives an intended vehicle 112 maneuver and estimated geographic location. As explained above, this information may be used to determine a list of potential pull-off areas for the vehicle 112. In particular, the intended maneuver indicates a type of pull-off area that would be suitable for the maneuver and the estimated geographic location provides a distance from the vehicle to the one or more pull-off candidates. Also, the vehicle 112 itself may provide the intended maneuver and estimated geographic location to a computing device on the vehicle to access a list of potential pull-off locations from a locally stored database 116. With the intended maneuver and the geographic location, a list of pull-off area candidates may be retrieved from the database 108 for use by the vehicle 112 in operation 410.

Continuing to FIG. 4B, the retrieved list of pull-off candidates from the database 108 may be ranked based on the confidence score associated with one or more of the candidates, the maneuver type, and the estimated geographic location of the vehicle 112 in operation 412. In general, the ranking of the candidates is configured to provide the best pull-off location for the vehicle 112. In other words, the list of candidates are ranked to provide the pull-off location that fits one or more aspects of the intended maneuver, such as the openness of the pull-off area, the closeness of the pull-off area to the vehicle's estimated location, the type of maneuver to be performed, etc. The ranking of the candidates may be based on other information, as well, such as one or more received preferences of a user of the system 100, a current weather condition at the vehicle's 112 location, an input concerning a pull-off area candidate from one or more on-board sensors of the vehicle, etc. In general, any information concerning the effectiveness of the pull-off area candidates may be considered when ranking the list of potential candidates. Further, as explained in more detail below, a machine-learning aspect may also be applied to adjust the confidence scoring and ranking of the pull-off candidates based on feedback concerning the effectiveness of the pull-off area.

In operation 414, the ranked list of obtained pull-off area candidates is provided to the vehicle 112. As explained above, the vehicle 112 or an operator of the vehicle may utilize the provided ranked list to perform the intended maneuver of the vehicle. In one particular example, an autonomous or semi-autonomous vehicle 112 may utilize the received list to select a pull-off area and control the vehicle to utilize the pull-off area.

After the vehicle 112 performs the maneuver, feedback information may be provided to the computing device 110 in operation 416 that indicates the effectiveness of the pull-off area for the intended maneuver of the vehicle. In other words, the vehicle 112 may monitor certain performance characteristics of the vehicle while performing the maneuver related to the condition of the selected pull-off area. In another embodiment, a user of the vehicle 112 or system 100 may provide information on the effectiveness of the pull-off area. For example, a user may provide feedback information to the computing device 110 on the availability of a selected parking lot, the availability of amenities of a selected area, the safety of a selected area, and the like. In operation 418, this feedback information may be utilized by the computing device 110 to adjust a confidence score of the selected pull-off area in the database 108. For example, a received indicator that the selected pull-off area did not meet the desired effectiveness of the vehicle or user of the vehicle may cause the computing device 110 to lower the confidence score for the selected pull-off area. In this manner, the feedback information received may be utilized to adjust the confidence score for one or more of the pull-off area candidates in the pull-off area database 108. Such adjustments may occur at the central server 106 level or on a vehicle by vehicle 112 level, such that the scoring and ranking of the candidates may be unique to a particular vehicle or may be globally applied.

Figure 5:
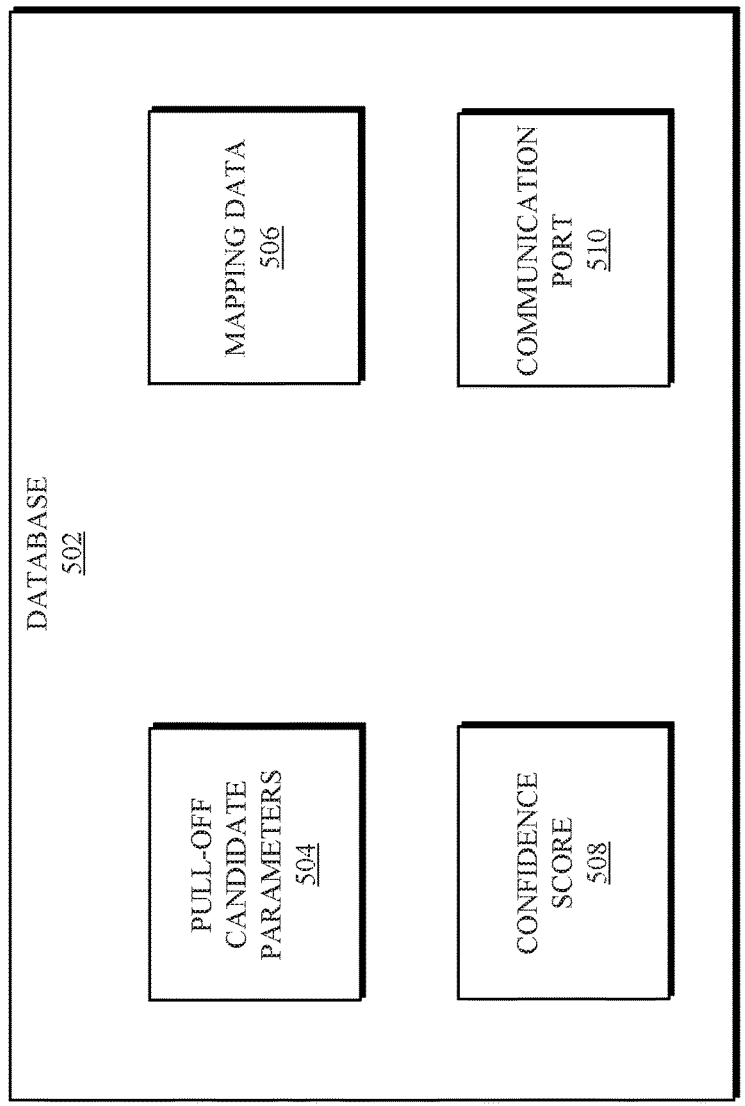
FIG. 5 is a diagram of a database for storing pull-off data from one or more data collectors to determine a pull-off area for a vehicle.

FIG. 5 is a diagram of a database 502 for storing pull-off area data from one or more data collectors to determine a pull-off area for a vehicle. In some instances, the database 502 may be a central database 108 of a central server 106 accessible by a computing device through a network. In another instance, the database 502 may be a local database 116 in communication with a mobile device 112, such as a vehicle or autonomous vehicle. Further, although described herein as including particular components, it should be appreciated that the database 502 may include more or fewer components that are described. In general, the database 502 is accessible by one or more computing devices to obtain the information stored in the database. The information stored in the database 502 may be organized in any manner for accessibility by computing devices in communication with the database.

As described above, the database 502 may include information concerning one or more pull-off area candidates 504. This pull-off candidate parameter information may include condition information, environmental information, or any other type of information for determining an effectiveness of a pull-off area for a particular vehicle maneuver. As also described above, one or more of the pull-off candidates stored in the database 502 may have an associated confidence score 508 stored in the database. The confidence score may, in part, be based on the parameters 504 of the pull-off candidates stored in the database 502.

In addition, the database 502 may include mapping data 506. The mapping data 506, in one embodiment, includes an estimated geographic location for the one or more pull-off area candidates stored in the database. Additional mapping data 506 may also be stored to provide the database 502 (or a computing device accessing the database) with additional mapping information for locating a pull-off area candidate and/or a vehicle or other mobile device. Also, the database 502 may include a communication port 510 for communicating with one or more computing devices. The communication port 510 provides an access point to the database 502 by the computing devices to retrieve the information stored in the database. Through the use of the information stored in the database 502, a mobile device (such as an autonomous vehicle or mobile communication device) may request or otherwise receive the pull-off information stored in the database server. With this information, the mobile device may determine a potential pull-off area for a vehicle or user of the vehicle for a particular vehicle maneuver.

Figure 6:
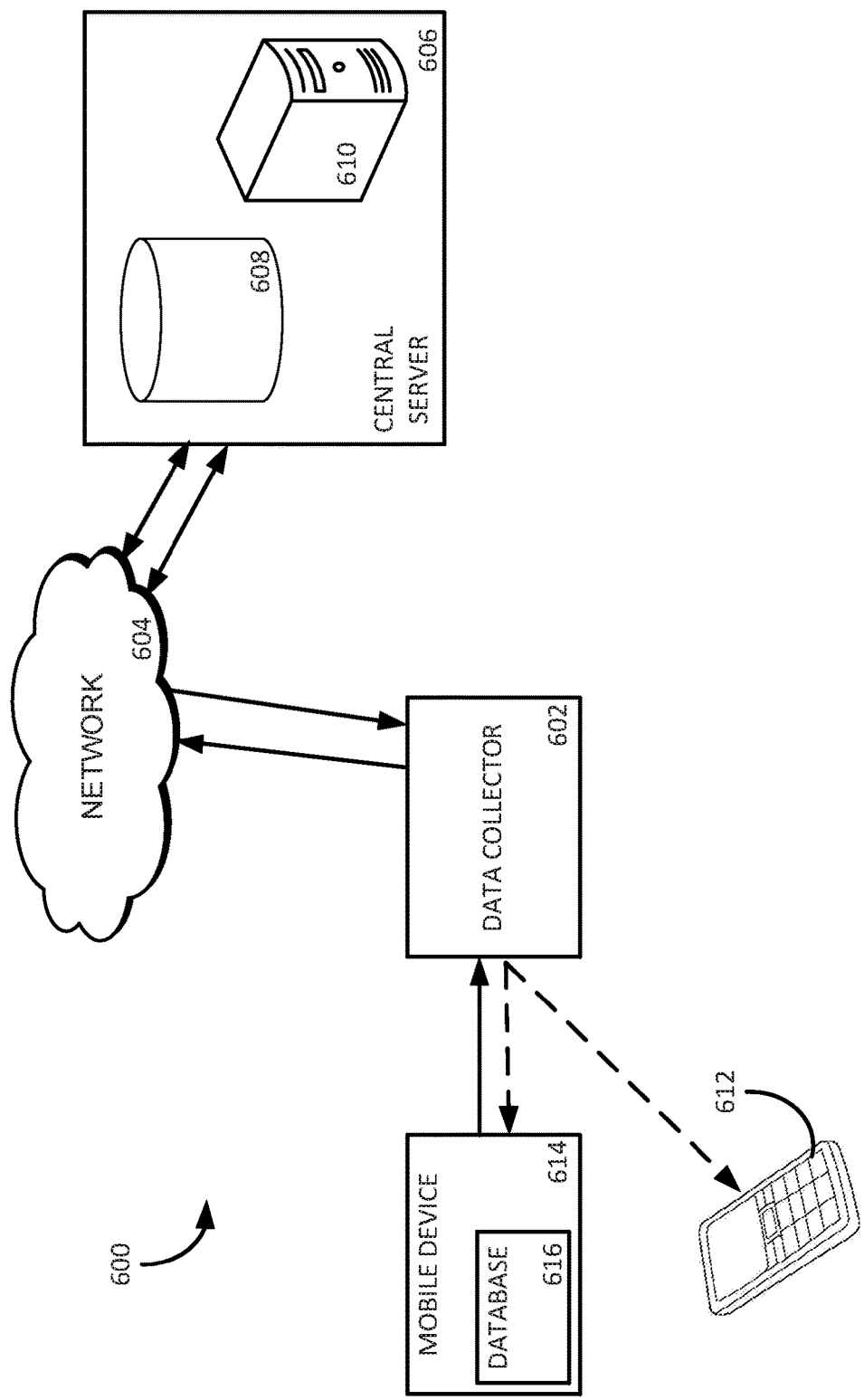
FIG. 6 is a diagram of a system for providing pull-off data a mobile device from a data collector for use in selecting a pull-off area for a vehicle.

Returning to FIG. 1, data collectors 102 may not always be in communication with the network 104 to provide the collected pull-off information to the central server 106. Thus, in one implementation, the data collectors 102 of the system may communicate with the other data collectors to transmit received and/or collected information. In particular, FIG. 6 is a diagram of a system for collecting and providing pull-off area candidate data from one data collector 602 to a mobile device 614 (such as an autonomous or semi-autonomous vehicle) for storing in a local database 616. The local database 616 may then be used by the vehicle to control an operation of the vehicle. The components illustrated in the system 600 of FIG. 6 are similar to those described above with relation to FIG. 1. For example, the system 600 includes a network 604, a central server 606 including a database 608 and processing device 610, and a mobile communication device 412. In general, the operations and specifics of the components described above may also apply to the components of the system 600 of FIG. 6. In addition, the system 600 includes a vehicle 614 that is not in communication with the network 604 and a data collector 602 that is in communication with the network.

As described above, data collector 602 of the system 600 is in communication with the network 604 to provide collected pull-off area information to the central server 606. Further, the central server 606 may collect or receive such data from multiple data collectors to crowd-source the pull-off area information. This information may then be provided to a vehicle through the network as the vehicle is generally also in communication with the network 604. However, in some instances, the vehicle 614 may not be in communication with the network 604. For example, vehicle 614 may not be within wireless communication range with the network 604 to receive the collected data from the database 608. In one implementation, the vehicle 614 may receive the information for a local pull-off database 616 directly from the data collector 602. In other words, at least a portion of the pull-off database information may be provided to a vehicle from a data collector 602 in communication with the network 604. In this manner, the vehicle 614 may receive the pull-off area database information even when not in direct communication with the network 604.

In another implementation, the vehicle 614 may transmit data it collects to another data collector in the system, as well as data it receives from another data collector. In this manner, collected information may be passed from one data collector to the next in the system 600, along with data received from other data collectors. Each data collector may determine if a connection to the network 604 is available and transmit the received information to the network and, if no connection to the network is available, to transmit the information to the nearest data collector in the system 600. Thus, the data collected by each of the data collectors in the system 600 may be provided to the central server 606 for aggregation and correlation by the central server.

Figure 7:
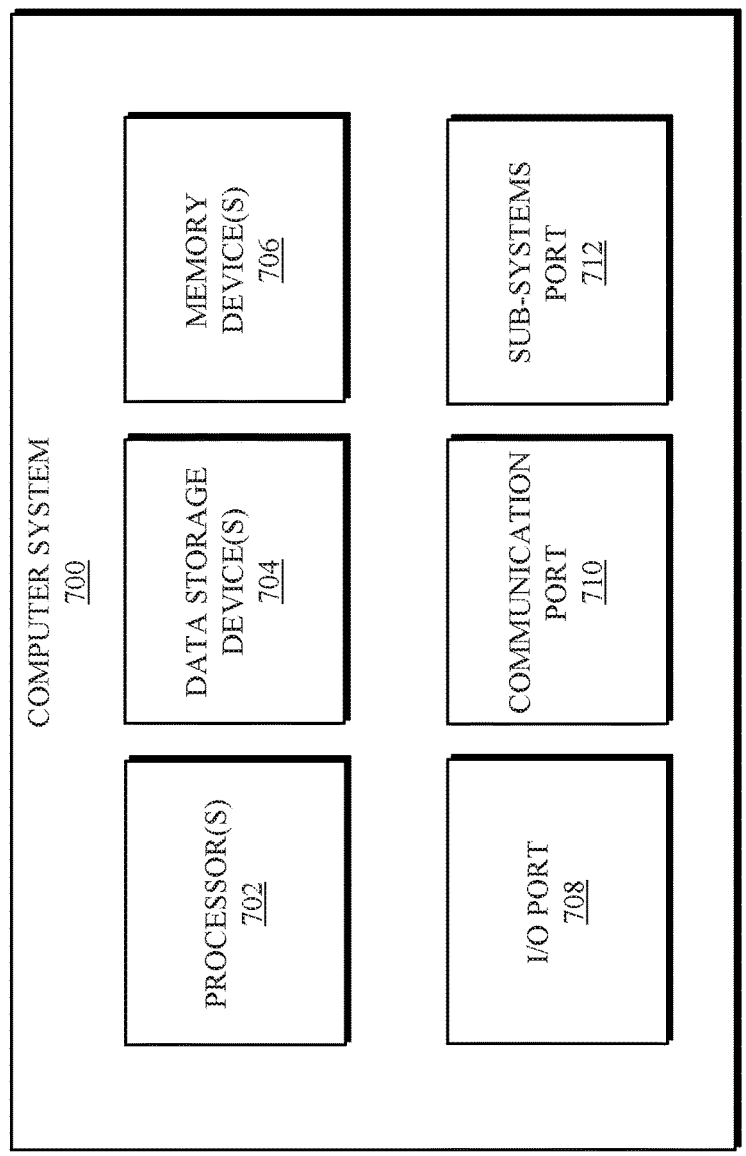
FIG. 7 is a diagram illustrating an example of a computing system which may be used in implementing embodiments of the present disclosure.

Referring now to FIG. 7, a detailed description of an example computing system 700 having one or more computing units that may implement various systems and methods discussed herein is provided. The computing system 700 may be applicable to the central server 106 or the mobile device 112 and other computing or network devices. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 706, and/or one or more ports 708-712. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device(s) 706, and/or communicated via one or more of the ports 708-712, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 710 may communicate with an antenna for electromagnetic signal transmission and/or reception. In some examples, an antenna may be employed to receive Global Positioning System (GPS) data to facilitate determination of a location of a machine, vehicle, or another device.

The computer system 700 may include a sub-systems port 712 for communicating with one or more systems related to a vehicle to control an operation of the vehicle and/or exchange information between the computer system 700 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

Figure 8:
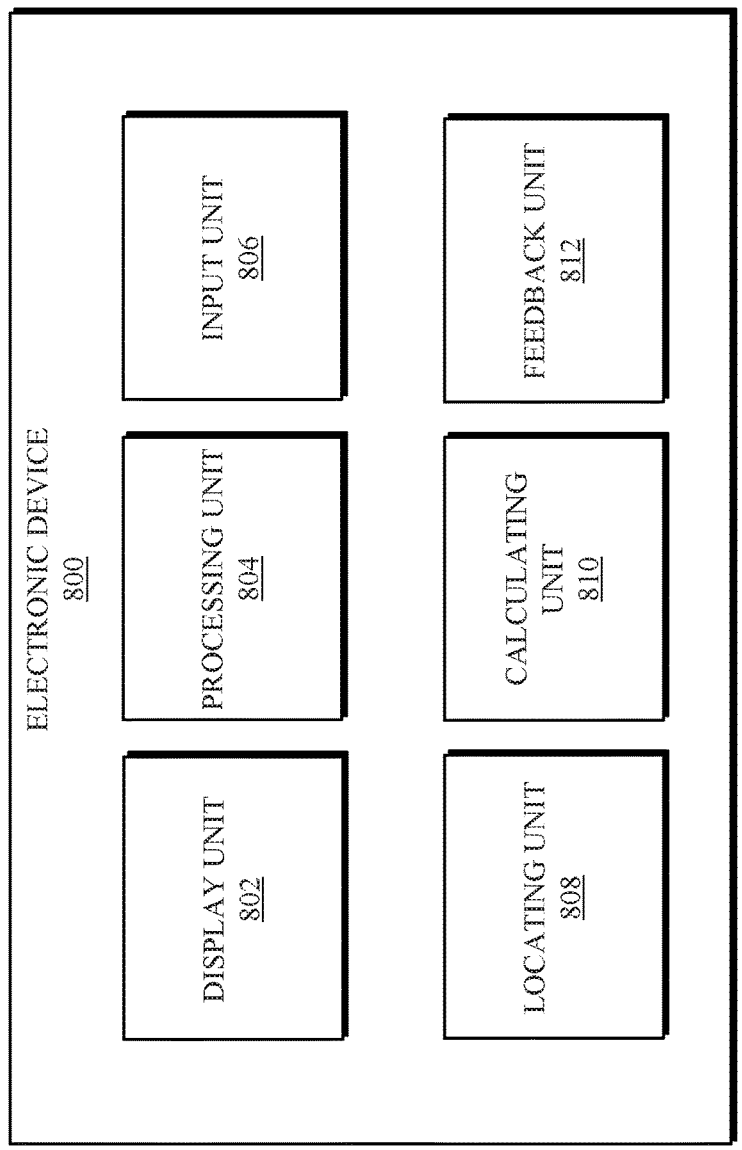
FIG. 8 is a functional block diagram of an electronic device including operational units arranged to perform various operations of the presently disclosed technology.

FIG. 8 is a functional block diagram of an electronic device including operational units arranged to perform various operations of the presently disclosed technology. The diagram 800 includes an electronic device 800 including operational units 802-812 arranged to perform various operations of the presently disclosed technology is shown. The operational units 802-812 of the device 800 are implemented by hardware or a combination of hardware and software to carry out the principles of the present disclosure. It will be understood by persons of skill in the art that the operational units 802-812 described in FIG. 8 may be combined or separated into sub-blocks to implement the principles of the present disclosure. Therefore, the description herein supports any possible combination or separation or further definition of the operational units 802-812.

In one implementation, the electronic device 800 includes a display unit 802 configured to display information, such as a graphical user interface, and a processing unit 804 in communication with the display unit 802 and an input unit 806 configured to receive data from one or more input devices or systems. Various operations described herein may be implemented by the processing unit 804 using data received by the input unit 806 to output information for display using the display unit 802.

Additionally, in one implementation, the electronic device 800 includes units implementing the operations described herein. For example, the device 800 may include a locating unit 808 to determine an estimated geographic location of a vehicle or a potential pull-off area candidate. A calculating unit 810 calculates a confidence score and/or provides a ranking of potential pull-off areas for storage in a database. In some implementations, a feedback unit 812 provides performance or effectiveness information of a pull-off area back to a central server for integration into the confidence score associated with one or more of the pull-off areas stored in the database.

Although discussed above as methods described by the flowcharts of FIGS. 3 through 4B, it should be appreciated that one or more operations may be omitted from the methods discussed. Further, the operations may be performed in any order and do not necessarily imply an order as provided. Rather, the methods discussed are merely one embodiment of the present disclosure as contemplated.

The present disclosure recognizes that the use of data may be used to the benefit of users. For example, the location information of a vehicle may be used to provide targeted information concerning a "best" path or route to the vehicle. Accordingly, use of such location data enables calculated control of an autonomous vehicle. Further, other uses for location data that benefit a user of the vehicle are also contemplated by the present disclosure.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for operating a mobile device, the method comprising:
   receiving an estimated geographic location and trajectory of a mobile device;
   obtaining a potential pull-off area from a database of available pull-off regions based at least on the received estimated geographic location and trajectory of the mobile device and a set of pull-off area candidate parameters of the potential pull-off area, wherein the database receives the set of pull-off area candidate parameters from a data collector and stores a confidence score to the potential pull-off area based at least on the set of pull-off area candidate parameters; and
   providing the selected potential pull-off area to the mobile device, wherein the mobile device is operated based on the selected potential pull-off area.

2. The method of claim 1 wherein the database receives, from a plurality of data collectors, a plurality of potential pull-off areas and a corresponding set of pull-off area candidate parameters and stores a confidence score to each of the plurality of potential pull-off areas based at least on the corresponding set of pull-off area candidate parameters.

3. The method of claim 2 further comprising:
   selecting a subset of the plurality of potential pull-off areas from the database based at least on the received estimated geographic location and trajectory of a mobile device;
   ranking the subset of the plurality of potential pull-off areas based at least on the confidence score assigned to each of the plurality of potential pull-off areas; and
   providing the ranked subset of the plurality of selected potential pull-off areas to the mobile device.

4. The method of claim 1 further comprising:
   receiving feedback information from the mobile device indicating an effectiveness of the selected potential pull-off area for the mobile device.

5. The method of claim 4 further comprising:
   adjusting the assigned confidence score of the potential pull-off area based on the received feedback information from the mobile device.

6. The method of claim 1 further comprising:
   receiving an intended maneuver of the vehicle, wherein selecting the potential pull-off area from the database is further based on the intended maneuver of the vehicle.

7. The method of claim 6 wherein the intended maneuver of the vehicle is an evasive maneuver to avoid interaction of the mobile device with an obstacle.

8. The method of claim 1 wherein the set of pull-off area candidate parameters corresponding to a potential pull-off area for a vehicle comprise at least one of friction estimates of the potential pull-off area, an estimated gradient of the potential pull-off area, and an estimated traffic density adjacent to the potential pull-off area.

9. The method of claim 1 wherein the data collector comprises a data collecting device and a sensor, the sensor obtaining condition information of the potential pull-off area for the vehicle.

10. The method of claim 1 wherein the database is a portion of a central server accessible through a wireless network.

11. A method for creating a database of available pull-off regions for a vehicle, the method comprising:
    receiving, from a data collector, a set of real-time pull-off area candidate parameters corresponding to a potential pull-off area for a vehicle;
    assigning a confidence score to the potential pull-off area based at least on the set of pull-off area candidate parameters;
    storing the potential pull-off area, the set of pull-off area candidate parameters and the assigned confidence score in the database;
    receiving feedback information from a mobile device indicating an effectiveness of a selected potential pull-off area for a particular vehicle; and
    adjusting the assigned confidence score of the selected potential pull-off area based on the received feedback information from the mobile device.

12. The method of claim 11 further comprising: receiving, from a plurality of data collectors, a plurality of potential pull-off areas and a corresponding set of pull-off area candidate parameters; and
    storing a plurality of confidence scores, each of the plurality of confidence scores assigned to one of the plurality of potential pull-off areas based at least on the corresponding set of pull-off area candidate parameters.

13. The method of claim 11 wherein the set of pull-off area candidate parameters corresponding to a potential pull-off area for a vehicle comprise at least one of friction estimates of the potential pull-off area, an estimated gradient of the potential pull-off area, and an estimated traffic density adjacent to the potential pull-off area.

14. The method of claim 11 wherein the data collector comprises a data collecting device and a sensor, the sensor obtaining condition information of the potential pull-off area for the vehicle.

15. The method of claim 11 wherein the database is a portion of a central server accessible through a wireless network.

16. The method of claim 11 wherein the database is a portion of an autonomous vehicle.

17. A system for controlling a vehicle, the system comprising:
    a geographic locating device providing an estimated geographic location and trajectory of the vehicle;
    an input device receiving an intended maneuver of the vehicle;
    a processor; and
    a non-transitory computer-readable medium storing instructions that, when executed by the processor, cause the processor to perform the operations of:
    receiving an estimated geographic location and trajectory of the vehicle from the geographic locating device;
    receiving the intended maneuver of the vehicle from the input device;
    obtaining a potential pull-off area from a database of available pull-off regions based at least on the received estimated geographic location and intended maneuver of the vehicle and a set of pull-off area candidate parameters of the potential pull-off area, the database receiving the set of pull-off area candidate parameters from a data collector and storing a confidence score to the potential pull-off area based at least on the set of pull-off area candidate parameters; and
    controlling the vehicle onto the selected potential pull-off area based on the selected potential pull-off area.

18. The system of claim 17 wherein the processor further performs the operations of:
    transmitting feedback information from the vehicle indicating a measured effectiveness of the selected potential pull-off area for the mobile device, wherein the assigned confidence score of the potential pull-off area is adjusted based on the received feedback information from the mobile device.

19. The system of claim 17 wherein the intended maneuver of the vehicle is an evasive maneuver to avoid interaction of the mobile device with an obstacle.

20. The system of claim 17 wherein the intended maneuver of the vehicle is a parking maneuver.

* * * * *